United States Patent
Goldberg et al.

(10) Patent No.: US 8,630,055 B2
(45) Date of Patent: Jan. 14, 2014

(54) SYSTEMS AND METHODS FOR MEDIUM CONTACT DETECTION

(75) Inventors: Jason S. Goldberg, Saint Paul, MN (US); Jeffrey Grundvig, Loveland, CO (US); Haotian Zhang, Longmont, CO (US)

(73) Assignee: LSI Corporation, San Jose, CA (US)

( * ) Notice: Subject to any disclaimer, the term of this patent is extended or adjusted under 35 U.S.C. 154(b) by 325 days.

(21) Appl. No.: 13/031,671

(22) Filed: Feb. 22, 2011

(65) Prior Publication Data

US 2012/0212851 A1 Aug. 23, 2012

(51) Int. Cl.
*G11B 21/02* (2006.01)

(52) U.S. Cl.
USPC ............... 360/75; 360/31; 360/46; 360/77.02

(58) Field of Classification Search
None
See application file for complete search history.

(56) References Cited

U.S. PATENT DOCUMENTS

| | | | |
|---|---|---|---|
| 6,038,091 A | 3/2000 | Reed et al. | |
| 6,088,176 A * | 7/2000 | Smith et al. | 360/46 |
| 6,092,412 A * | 7/2000 | Flechsig et al. | 73/105 |
| 6,292,317 B1 * | 9/2001 | Alexander | 360/31 |
| 6,310,739 B1 * | 10/2001 | McEwen et al. | 360/25 |
| 6,600,622 B1 * | 7/2003 | Smith | 360/77.06 |
| 6,671,111 B2 * | 12/2003 | Ottesen et al. | 360/31 |
| 7,215,495 B1 | 5/2007 | Che et al. | |
| 7,522,360 B2 * | 4/2009 | Imamura et al. | 360/31 |
| 7,639,442 B2 * | 12/2009 | Hashizume et al. | 360/31 |
| 8,089,719 B1 * | 1/2012 | Dakroub | 360/75 |
| 8,259,406 B2 * | 9/2012 | Kazusawa et al. | 360/46 |
| 2004/0075925 A1 * | 4/2004 | Gong et al. | 360/31 |
| 2007/0127148 A1 * | 6/2007 | Yokohata et al. | 360/31 |
| 2011/0141603 A1 * | 6/2011 | Kazusawa et al. | 360/46 |

\* cited by examiner

*Primary Examiner* — Dismery Mercedes
(74) *Attorney, Agent, or Firm* — Hamilton DeSanctis & Cha (57) ABSTRACT

Various embodiments of the present invention provide systems and methods for detecting contact. For example, a method for detecting head contact is disclosed that includes: receiving an interface signal operable to indicate a physical contact between a sensing device and a storage medium; band pass filtering a data set derived from the interface signal to yield a band pass filtered output; comparing the band pass filtered output to a level threshold to yield a comparator output; summing the comparator output with at least one prior instance of the comparator output to yield an aggregated value; and comparing the aggregated value to an aggregate threshold to yield a contact output.

20 Claims, 7 Drawing Sheets

SYSTEMS AND METHODS FOR MEDIUM CONTACT DETECTION

BACKGROUND OF THE INVENTION

The present inventions are related to systems and methods for transferring information to and from a storage medium, and more particularly to systems and methods for detecting contact between a sensor and the storage medium.

Various electronic storage media are accessed through use of a read/write head assembly that is positioned in relation to the storage medium. The read/write head assembly is supported by a head actuator, and is operable to read information from the storage medium and to write information to the storage medium. The distance between the read/write head assembly and the storage medium is typically referred to as the fly height. Control of the fly height is critical to proper operation of a storage system. In particular, increasing the distance between the read/write head assembly and the storage medium typically results in an increase in inter symbol interference. Where inter symbol interference becomes unacceptably high, it may become impossible to credibly read the information originally written to the storage medium. In contrast, a fly height that is too small can result in excess wear on the read/write head assembly and/or a premature destruction of the storage device.

At times the read/write head assembly may come into contact with the storage medium resulting in potential damage to either or both of the storage medium and the read/write head assembly. It is desirable to know when contact between the read/write head assembly and the storage medium occurs so the storage system may check for data integrity and make fly height adjustments for reliability. In general, there are two types of detection that may occur. First, there may be touchdown detection that is a somewhat steady state contact. Second, thermal asperity detection considers intermittent contact involving imperfections on the surface of the storage medium and/or contaminants on the storage medium the drive. One type of contact sensor includes an element whose resistance changes with temperature and whose temperature may vary due to frictional forces from contact with the disk or due to changes in airflow or thermal conductivity of the surrounding area.

Some existing sensors have been implemented that utilize analog circuitry implemented as an amplifier associated with the read/write head assembly to detect both thermal asperity related contact and touchdown related contact. The difference between the types of contact is determined based at least in part on a frequency received from a sensor. Such processing in analog circuitry is limited resulting in a less accurate indication of a detected sensor contact.

Hence, for at least the aforementioned reasons, there exists a need in the art for advanced systems and methods for detecting contact between the read/write head assembly and the storage medium.

BRIEF SUMMARY OF THE INVENTION

The present inventions are related to systems and methods for transferring information to and from a storage medium, and more particularly to systems and methods for detecting contact between a sensor and the storage medium.

Various embodiments of the present invention provide methods for detecting head contact that include: receiving an interface signal operable to indicate a physical contact between a sensing device and a storage medium; band pass filtering a data set derived from the interface signal to yield a band pass filtered output; comparing the band pass filtered output to a level threshold to yield a comparator output; summing the comparator output with at least one prior instance of the comparator output to yield an aggregated value; and comparing the aggregated value to an aggregate threshold to yield a contact output. In some instances of the aforementioned embodiments, the comparator output is asserted to indicate the band pass filtered output is greater than the level threshold, and the contact output is asserted to indicate that the aggregated value is greater than the aggregate threshold. In some cases, the number of prior instances of the comparator output that are included in the aggregated value corresponds to a programmable window width value.

In various instances of the aforementioned embodiments, the interface signal provides a contact signature when the sensing device physically contacts the storage device. In one or more instances of the aforementioned embodiments, the methods further include converting a derivative of the interface signal to a series of digital samples, and wherein the data set is derived from the series of digital samples. In some such instances, the methods may further include digitally filtering the series of digital samples to yield the data set.

In some instances of the aforementioned embodiments, the methods further include: band pass filtering the data set derived from the interface signal to yield a second band pass filtered output; comparing the second band pass filtered output to a second level threshold to yield a second comparator output; summing the second comparator output with at least one prior instance of the second comparator output to yield a second aggregated value; comparing the second aggregated value to the aggregate threshold to yield a second contact output; and asserting a confirmed contact output when either the first contact output or the second contact output is asserted. In some such cases, the first band pass filtered output corresponds to a center frequency that corresponds to a first contact signature, and the second band pass filtered output corresponds to a center frequency that corresponds to a second contact signature.

Other embodiments of the present invention provide head contact detection circuits. Such head contact detection circuits include a band pass filter circuit, a first comparator circuit, a second comparator circuit, and a summation circuit. The band pass filter circuit is operable to band pass filter a derivative of an interface signal to yield a band pass filtered output. The interface signal is operable to indicate a physical contact between a sensing device and a storage medium, and a center frequency of the band pass filter circuit is a contact signature. The first comparator circuit is operable to compare the band pass filtered output with a level threshold to yield a comparator output. The summation circuit operable to aggregate the comparator output with at least one prior instance of the comparator output to yield an aggregated value. The second comparator circuit is operable to compare the aggregated value with an aggregate threshold to yield a contact output. In some cases, the number of prior instances of the comparator output that are included in the aggregated value corresponds to a programmable window width value. In some cases, the band pass filter circuit is implemented as a discrete Fourier transform circuit. In other cases, the band pass filter circuit is implemented as an infinite impulse response filter.

In some instances of the aforementioned embodiments, the band pass filter circuit is a first band pass filter circuit, the band pass filtered output is a first band pass filtered output, the level threshold is a first level threshold, the comparator output is a first comparator output, the aggregated value is a first aggregated value, the summation circuit is a first summation circuit, the contact signature is a first contact signature, the contact output is a first contact output. In such cases, the circuit further includes a second band pass filter circuit, a third comparator circuit, a second summation circuit, and a fourth comparator circuit. The second band pass filter circuit is operable to band pass filter the derivative of the interface signal to yield a second band pass filtered output. A center frequency of the second band pass filter circuit is a second contact signature. The third comparator circuit is operable to compare the second band pass filtered output with a second level threshold to yield a second comparator output. The second summation circuit is operable to aggregate the second comparator output with at least one prior instance of the second comparator output to yield a second aggregated value. The fourth comparator circuit is operable to compare the second aggregated value with the aggregate threshold to yield a second contact output.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIG. 1b shows the read/write head assembly of FIG. 1a disposed in relation to the disk platter of FIG. 1a;

DETAILED DESCRIPTION OF THE INVENTION

The present inventions are related to systems and methods for transferring information to and from a storage medium, and more particularly to systems and methods for detecting contact between a sensor and the storage medium.

Various embodiments of the present invention provide for a digital domain read channel circuit that measures various types of contact signatures provided via a head disk interface sensor. As used herein, the phrase "contact signature" is used in its broadest sense to mean a value or series of values indicating contact between a sensor and a sensed element. In some embodiments of the present invention, the contact signatures are frequencies or frequency signatures indicative of contact. The read channel circuit utilizes advanced filtering and detection techniques to yield increased contact detection accuracy. In one particular embodiment of the present invention, contact between the read/write head assembly is detected and characterized using a variety of digital signal processing techniques. Such digital signal processing techniques may include, but are not limited to, processing a signal received from the head disk interface sensor through multiple band-pass filters with different center frequencies, determined by the particular signature of the head disk interface sensor. Further, the width of any band pass filtering may be narrower than previously available in analog processing systems t comparable implementation costs/size requirements.

In one or more embodiments of the present invention, circuits or an instruction driven processor are used to weight each output from the aforementioned multiple band-pass filters according to a specific criteria determined to maximize positive contact detection while minimizing false positives from non-contact events. In particular embodiments of the present invention, the aforementioned weighting process is trained or calibrated during an initial calibration phase. Various embodiments of the present invention rely on a two-level thresholding scheme that qualifies an initial, amplitude-based simple threshold detection with a second sliding-window threshold. As used herein, the term "derivative" is used in its broadest sense to mean something derived from something else. Hence, a first signal derived from a second signal may be, the same as the second signal or may be the second signal that has been processed to some level.

Figure 1A:
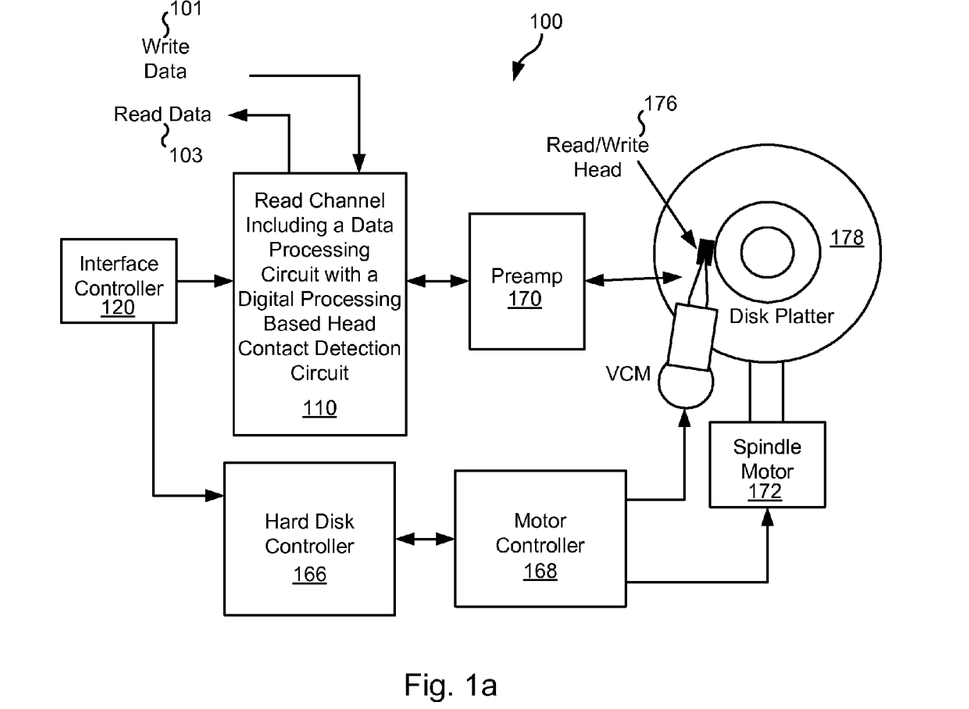
FIG. 1a depicts a storage device including a read channel including a data processing circuit with a digital processing based head contact detection circuit in accordance with one or more embodiments of the present invention.

Turning to FIG. 1a, a storage device 100 including a read channel circuit 110 having a data processing circuit with a digital processing based head contact detection circuit. Storage device 100 may be, for example, a hard disk drive. Read channel circuit 510 includes a digital processing based head contact detection circuit that may be implemented consistent with that discussed in relation to FIGS. 2-3 below, and/or may operate consistent with the method discussed below in relation to FIG. 4. Further, read channel circuit 110 may include a data detector, such as, for example, a Viterbi algorithm data detector, and/or a data decoder circuit, such as, for example, a low density parity check decoder circuit. In addition to read channel circuit 110, storage device 100 includes a read/write head assembly 176 disposed in relation to a disk platter 178. Read/write head assembly 176 is operable to sense information stored on disk platter 178 and to provide a corresponding electrical signal to read channel circuit 110.

Storage device 100 also includes an interface controller 120, a hard disk controller 166, a motor controller and fly height controller 168, and a spindle motor 172. Interface controller 120 controls addressing and timing of data to/from disk platter 178. The data on disk platter 178 consists of groups of magnetic signals that may be detected by read/write head assembly 176 when the assembly is properly positioned over disk platter 178. In one embodiment, disk platter 178 includes magnetic signals recorded in accordance with a perpendicular recording scheme. In other embodiments of the present invention, disk platter 178 includes magnetic signals recorded in accordance with a longitudinal recording scheme. Motor controller and fly height controller 168 controls the spin rate of disk platter 178 and the location of read/write head assembly 176 in relation to disk platter 178.

Figure 1B:
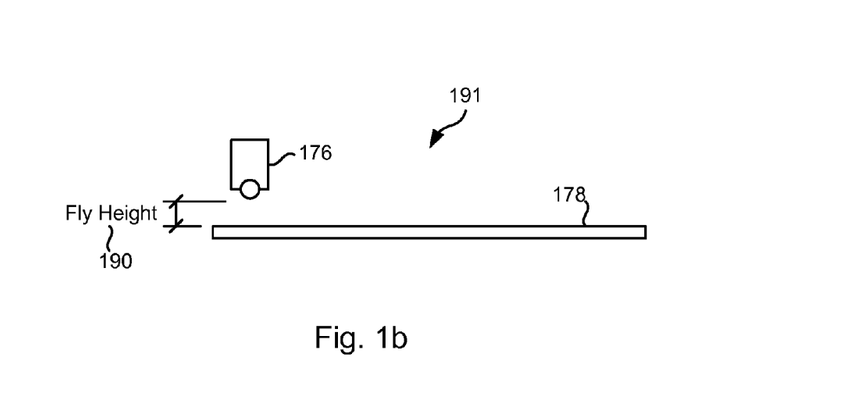

As shown in a cross sectional diagram 191 of FIG. 1b, the distance between read/write head assembly 176 and disk platter 178 is a fly height 190. Fly height 190 is controlled by motor controller 168 and read channel 110 based upon information provided from the digital processing based head contact detection circuit.

In a typical read operation, read/write head assembly 176 is accurately positioned by motor controller 168 over a desired data track on disk platter 178. Motor controller 168 positions read/write head assembly 176 in relation to disk platter 178, and drives spindle motor 172 by moving read/write head assembly 176 to the proper data track on disk platter 178 under the direction of hard disk controller 166. Spindle motor 172 spins disk platter 178 at a determined spin rate (RPMs). Once read/write head assembly 178 is positioned adjacent the proper data track, magnetic signals representing data on disk platter 178 are sensed by read/write head assembly 176 as disk platter 178 is rotated by spindle motor 172. The sensed magnetic signals are provided as a continuous, minute analog signal representative of the magnetic data on disk platter 178. This minute analog signal is provided by read/write head assembly 176 to read channel circuit 110. In turn, read channel circuit 110 decodes and digitizes the received analog signal to recreate the information originally written to disk platter 178. This data is provided as read data 103 to a receiving circuit. A write operation is substantially the opposite of the preceding read operation with write data 101 being provided to read channel circuit 110. This data is then encoded and written to disk platter 178.

It should be noted that storage system 100 may be integrated into a larger storage system such as, for example, a RAID (redundant array of inexpensive disks or redundant array of independent disks) based storage system. It should also be noted that various functions or blocks of storage system 100 may be implemented in either software or firmware, while other functions or blocks are implemented in hardware.

Figure 2:
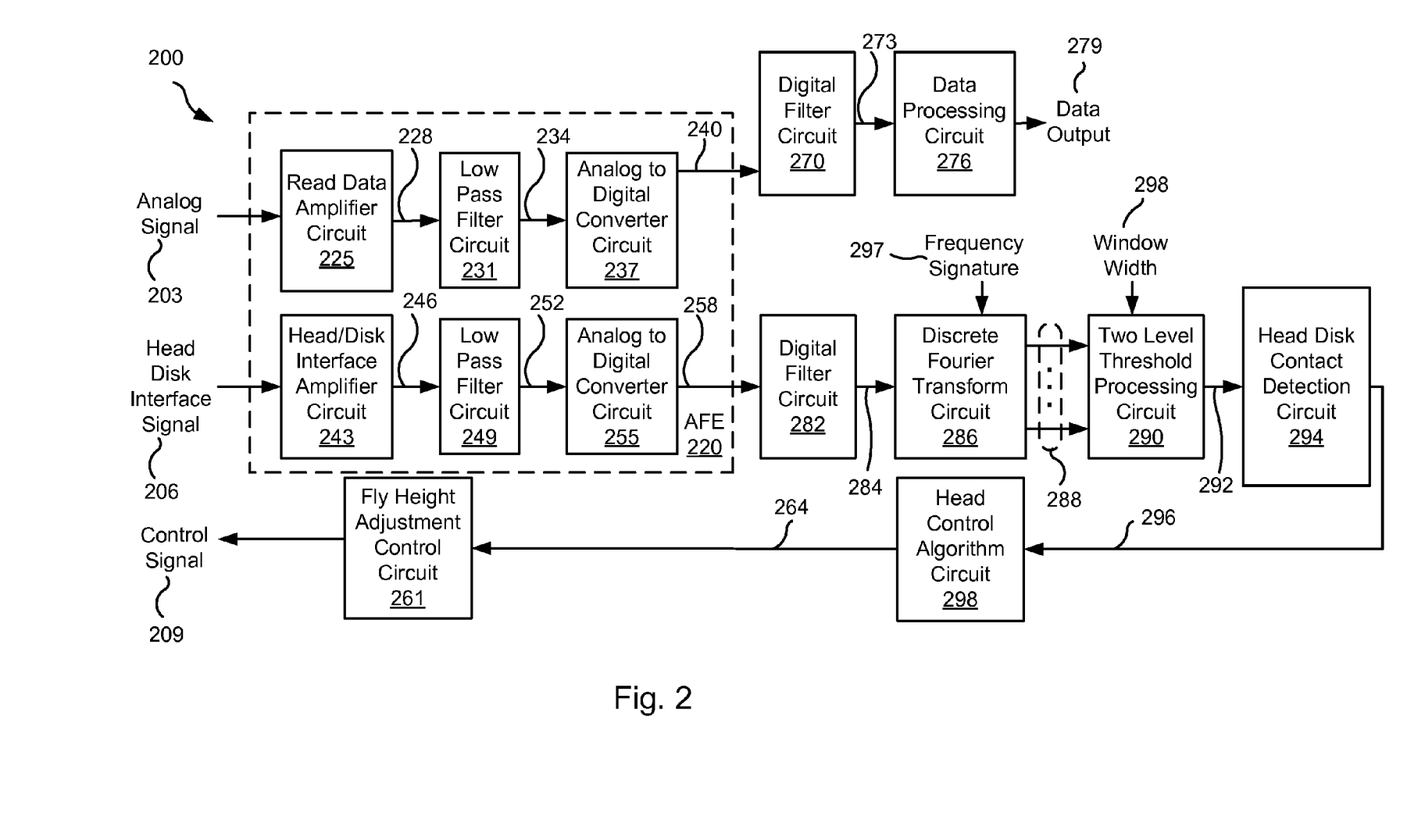
FIG. 2 depicts a contact detection system in accordance with various embodiments of the present invention.

Turning to FIG. 2, a contact detection system 200 is shown in accordance with various embodiments of the present invention. Contact detection system 200 includes an analog front end circuit 220 that interfaces to a read/write head assembly (not shown) and a head disk interface circuit (not shown). Analog front end circuit 220 includes a read data amplifier circuit 225 that receives an analog input signal 203. Analog input signal 203 is provided by a read/write head assembly (not shown) that senses information on a storage medium (not shown). Read data amplifier circuit 225 amplifies the received input and provides an amplified output 228. Read data amplifier circuit 225 may be any circuit known in the art that is capable of amplifying an analog input signal. Based upon the disclosure provided herein, one of ordinary skill in the art will recognize a variety of amplifier circuits that may be used in relation to different embodiments of the present invention. Amplified output 228 is provided to a low pass filter circuit 231 that provides a corresponding filtered output 234. Low pass filter circuit 231 may be any circuit known in the art that is capable of filtering an analog signal. Based upon the disclosure provided herein, one of ordinary skill in the art will recognize a variety of filter circuits that may be used in relation to different embodiments of the present invention. Filtered output 234 is provided to an analog to digital converter circuit 237 that provides a corresponding series of digital samples 240. Analog to digital converter circuit 237 may be any circuit known in the art that is capable of converting a continuous time signal to a series of sample values. Based upon the disclosure provided herein, one of ordinary skill in the art will recognize a variety of analog to digital converter circuits that may be used in relation to different embodiments of the present invention.

In addition, analog front end circuit 220 includes a head/disk interface amplifier circuit 243 that receives a head disk interface signal 206. In some embodiments of the present invention, head disk interface signal 206 is a varying voltage caused by passing a constant current through an element whose resistance is proportional to temperature. Where the read/write head assembly contacts the storage medium, the friction results in a change in temperature that is detectable by monitoring head disk interface signal 206. Head disk interface signal 206 is provided by a head/disk interface circuit (not shown) that senses contact between a read/write head assembly and a storage medium. Of note, in some implementations, analog signal 203 and head disk interface signal 206 are interfaces to the read/write head assembly via a preamplifier circuit. Head disk interface amplifier circuit 243 amplifies the received input and provides an amplified output 246. Head disk interface amplifier circuit 206 may be any circuit known in the art that is capable of amplifying an analog input signal. Based upon the disclosure provided herein, one of ordinary skill in the art will recognize a variety of amplifier circuits that may be used in relation to different embodiments of the present invention. Amplified output 246 is provided to a low pass filter circuit 249 that provides a corresponding filtered output 252. Low pass filter circuit 249 may be any circuit known in the art that is capable of filtering an analog signal. Based upon the disclosure provided herein, one of ordinary skill in the art will recognize a variety of filter circuits that may be used in relation to different embodiments of the present invention. In some cases, low pass filter circuit 249 includes an anti-aliasing filter (prep for sampling), a programmable amplifier (ensure signal is scaled properly for the ADC), and a sample and hold circuit that holds the signal in preparation for processing by an analog to digital converter circuit 255 to which filtered output 252 is applied. Analog to digital converter circuit 255 provides a corresponding series of digital samples 258. Analog to digital converter circuit 255 may be any circuit known in the art that is capable of converting a continuous time signal to a series of sample values. Based upon the disclosure provided herein, one of ordinary skill in the art will recognize a variety of analog to digital converter circuits that may be used in relation to different embodiments of the present invention.

In some embodiments of the present invention, filtered output 252 is passed to analog to digital converter circuit 255 via a differential pair. In some cases, head disk interface amplifier circuit 243 and low pass filter circuit 249 are implemented in or very near the read/write head assembly, and analog to digital converter circuit 255 is implemented as part of a digital read channel circuit along with analog to digital converter circuit 237, digital filter circuit 270 and data processing circuit 276. In some cases, filtered output 252 may be passed between the read/write head assembly and the digital read channel circuit via a set of dedicated pins on the read/write head assembly and/or the digital read channel circuit, or by multiplexing filtered output 252 onto existing I/O (e.g., the Reader lines, the Serial Port lines, or the Writer lines). Of note, head disk interface signal may be either single ended or differential. Where it is single ended, single ended circuitry will be used for processing, and where it is differential the processing circuitry may be differential.

Contact detection system 200 includes a fly height adjustment control circuit 261 that provides a control signal 209 to the read/write head assembly (not shown). Control signal 209 causes a fly height between the read/write head assembly and a storage medium to be adjusted. Control signal 209 corresponds to a head control input 264. Fly height adjustment control circuit 261 may be any circuit known in the art that is capable of adjusting the fly height control. In some cases, fly height adjustment control circuit 261 is implemented as part of a preamplifier circuit (not shown).

Digital samples 240 are provided to a digital filter circuit 270 that operates to provide a corresponding filtered output 273. In some embodiments of the present invention, digital filter circuit 270 is a digital finite impulse response filter as are known in the art. Filtered output 273 is provided to a data processing circuit 276 that operates to decode the received data set to yield a data output 279. In some embodiments of the present invention the data processing circuit includes a data detector circuit and a data decoder circuit as are known in the art. In one particular embodiment of the present invention, the data detector circuit is a maximum a posteriori data detector circuit as are known in the art, and the data decoder circuit is a low density parity check circuit as are known in the art. Based upon the disclosure provided herein, one of ordinary skill in the art will recognize a variety of data processing circuits that may be used in relation to different embodiments of the present invention.

Digital samples 258 are provided to a digital filter circuit 282 that operates to provide a corresponding filtered output 284. In some embodiments of the present invention, digital filter circuit 282 is a digital finite impulse response filter as are known in the art. Filtered output 284 is provided to a discrete Fourier transform circuit 286. Discrete Fourier transform circuit 286 provides multiple outputs (i.e., transformed output 288) that each correspond to a respective center frequency. By providing multiple outputs each tuned to a respective center frequency, the signal to noise ratio of a signal used to detect contact is increased. In particular, discrete Fourier transform circuit 286 is tuned to provide an output corresponding to a finite number of frequencies. The center frequencies correspond to frequency signatures indicative of contact between the read/write head assembly and the storage medium. The defined frequency signatures are provided as a modifiable frequency signature input 297. When a read/write head assembly contacts a storage medium over which the read/write head assembly is disposed head disk interface signal 206 exhibits a frequency distinguishable from surrounding noise. During a calibration process, one or more contact signatures or frequencies indicative of contact between the read/write head assembly and the storage medium are identified and stored. These contact signatures are provided to discrete Fourier transform circuit 286 as a frequency signature input 297. Of note, Discrete Fourier transform circuit 286 may be any circuit known in the art that is capable of applying a discrete Fourier transform to a series of digital values. Based upon the disclosure provided herein, one of ordinary skill in the art will recognize a variety of discrete Fourier transform circuits that may be used in relation to different embodiments of the present invention. Discrete Fourier transform circuit 286 provides a transformed output 288. In some cases, the outputs of band pass filters including components of a contact detection signature (i.e., a frequency signature) may be passed independently to a subsequent processing stage, or they may be used (possibly summed) together in a weighted fashion to further enhance the detection capabilities of the algorithm. Further, it should be noted that in other embodiments of the present invention that an infinite impulse response filter (IIR) may be used in place of discrete Fourier transform circuit 286.

Transformed output 288 is provided to a two level threshold processing circuit 290. Two level threshold processing circuit 290 performs two different level processes that include determining whether any values of transformed output 288 correspond to a defined contact signature, and that the defined contact signature is continued for a defined period. To do this, two level threshold processing circuit 290 compares the multiple frequency indicators provided as transformed output to level thresholds. Such threshold detection compares the respective band pass filter outputs of transformed output 288 to one or more level threshold values. In some cases, these level threshold values are programmable. Where a given one of the band pass filter outputs of transformed output 288 exceeds the corresponding level threshold, an indication of a potential contact corresponding to the given frequency is asserted.

It is then determined whether the threshold is exceeded for a defined period corresponding to a window width input 298. Where the threshold remains for a length of time defined by the window width input 298, the previously determined potential contact is confirmed causing a filter result output 292 to be asserted. In one particular embodiment, determining that the threshold remains for the length of time defined by the window width input 298 is done by summing the values of the respective band pass filter outputs of transformed output 288 over the window period, and comparing the resulting aggregate value against an aggregate threshold. Where the aggregate threshold is exceeded, the previously determined potential contact is confirmed causing a filter result output 292 to be asserted. In some cases, the aggregate threshold is programmable. It is important to note that in the case of utilizing multiple individual signals from selected band-pass filters in the first threshold comparison, that the results after comparing each signal to the aggregate threshold may be combined (for example, by a summation, a weighted summation, or an 'OR' operation) to further enhance the detection capability of the algorithm.

It should be noted that the level threshold values, the aggregate threshold value, and the window width value may be set independently for each band-pass filter output, or may be designed to depend from each other. The selection of the level threshold values, the aggregate threshold value, and the window width value govern the operation of contact detection system 200. The level threshold should be selected to ensure contact events are identified. Both window width and aggregate threshold may be determined as the lowest settings to allow reliable detection without false positives, namely detecting contact when none has occurred. One method of optimizing selection of these three parameters for touchdown detection involves setting the sensor height—through setting of the fly height control (FHC) heater—high enough to ensure no touchdown, and then calibrating the settings to the lowest settings that give no false positives. Then, the fly height control setting is slowly reduced. At each step down, the parameters are varied over a predetermined range to look for contact. If none is detected, the fly height control setting is reduced and the procedure is repeated, until touchdown is detected.

Filter result output 292 is provided to a head disk contact detection circuit 294. Filter result output 292 is asserted whenever both transformed output 288 is exactly or near a defined signature frequency and that frequency has been maintained during the defined time period. Otherwise, filter result output 292 is de-asserted. Where filter result 292 is asserted, head disk contact detection circuit 294 asserts a contact output 296 to a head control algorithm circuit 298. Head control algorithm circuit 298 may be any circuit known in the art that is capable of communicating a head control input 264 that is a command that causes fly height adjustment control circuit 261 to adjust the read/write head assembly up and away from the storage medium.

In some embodiments of the present invention, digital filter circuit 282, discrete Fourier transform circuit 286, two level threshold processing circuit 290 and head disk contact detection circuit 294 are implemented as part of a general purpose digital signal processing circuit. Such a digital signal processing circuit executes instructions maintained in a storage medium that may be, for example, a random access memory. In such cases, the operations of digital filter circuit 282, discrete Fourier transform circuit 286, two level threshold processing circuit 290 and head disk contact detection circuit 294 are performed by executing instructions in the digital signal processor.

In some cases, contact detection system 200 may be used to set the correct heater digital to analog converter settings. In such a case, in the factory, after the touchdown fly height control setting is determined, the heater digital to analog converter setting is reduced by a predetermined amount to allow margin for the fly height/clearance (separation between the read/write head assembly and the storage medium). This procedure may be repeated in the field to adjust for environmental or system changes/aging that may have affected fly height or clearance. If an algorithm exists in the drive for a relative fly height change indicator, it may be used as a signal to perform a recalibration.

Figure 3A:
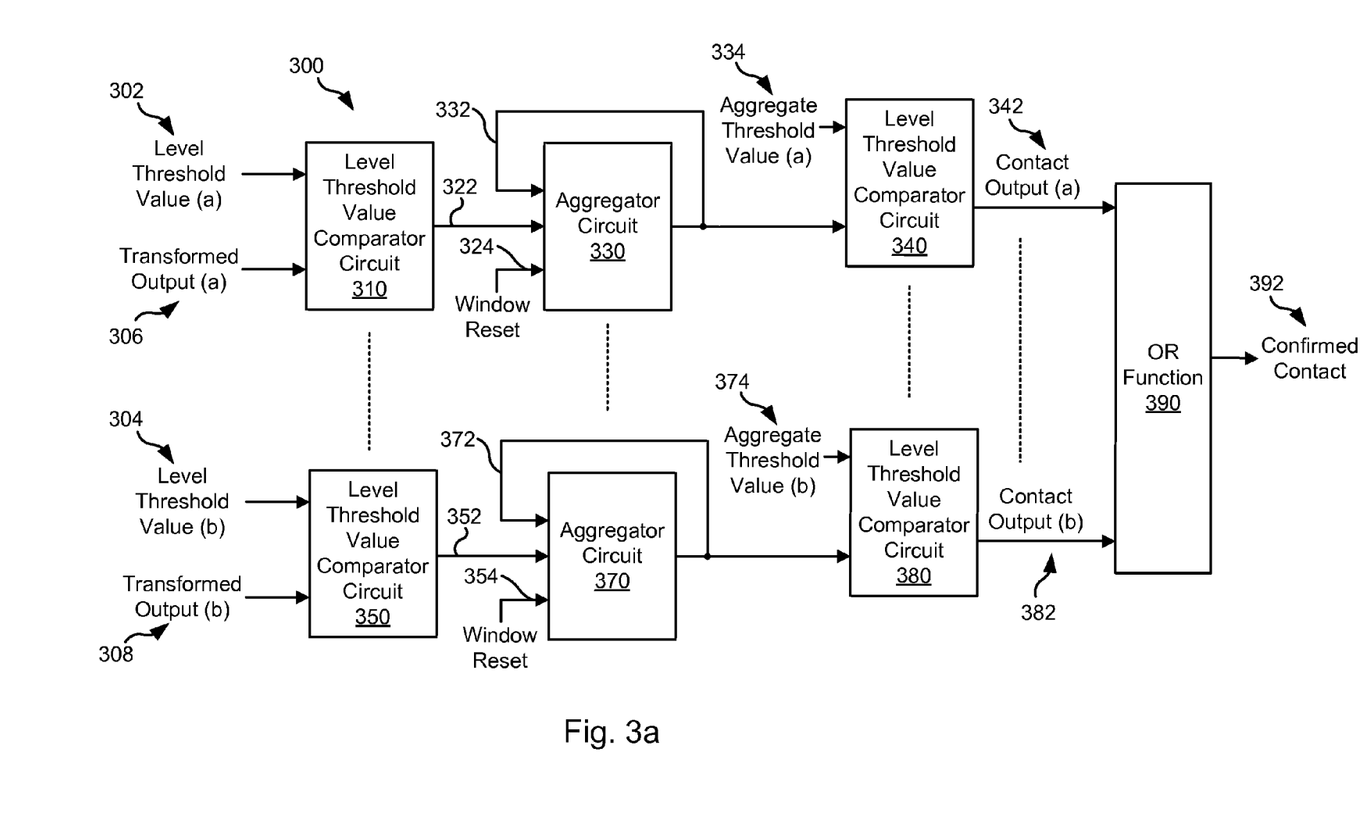
FIG. 3a depicts a two-level thresholding circuit that may be used in relation to the circuit of FIG. 2 in accordance with one or more embodiments of the present invention.

Turning to FIG. 3a, a two level threshold processing circuit 300 is shown in accordance with one or more embodiments of the present invention. Two level threshold processing circuit 300 may be used in place of two level threshold processing circuit 290 described above in relation to FIG. 2. Two level threshold processing circuit 300 includes a plurality of level threshold value comparator circuits 310, 350 that compare respective level threshold values with corresponding transformed outputs 306, 308. In particular, level threshold value comparator circuits 310 compares transformed output 306 with level threshold value 302, and level threshold value comparator circuits 350 compares transformed output 308 with level threshold value 304. Where transformed output 306 is greater than level threshold value 302, a preliminary contact indication 322 is asserted, otherwise it is de-asserted. Where transformed output 308 is greater than level threshold value 304, a preliminary contact indication 352 is asserted, otherwise it is de-asserted.

It should be noted that while two threshold value comparator circuits are shown, only one or more than two may be used in accordance with different embodiments of the present invention. The number of level threshold value comparator circuits corresponds to the number of transformed outputs (i.e., band pass filters in discrete Fourier transform circuit 286) that are provided. The ability to include more or fewer than the two parallel circuits shown is indicated by the dashed lines on FIG. 3a.

An aggregator circuit 330 sums the values provided as preliminary contact indication 322 over a period corresponding to the window width and indicated by a window reset 324. Window reset may be controlled, for example, by a circuit that de-asserts window reset 324 whenever preliminary contact indication 322 is initially asserted, and re-asserts window reset 324 at the end of a period corresponding to a number of bit periods indicated by the window width input 298. A resulting aggregate output 332 is provided to a level threshold value comparator circuit 340 where it is compared with an aggregate threshold value 334. Where the resulting aggregate output 332 exceeds aggregate threshold value 334, level threshold value comparator circuit 340 asserts a contact output 342.

An aggregator circuit 370 sums the values provided as preliminary contact indication 352 over a period corresponding to the window width and indicated by a window reset 354. Window reset may be controlled, for example, by a circuit that de-asserts window reset 354 whenever preliminary contact indication 352 is initially asserted, and re-asserts window reset 324 at the end of a period corresponding to a number of bit periods indicated by the window width input 298. A resulting aggregate output 372 is provided to a level threshold value comparator circuit 380 where it is compared with an aggregate threshold value 374. Where the resulting aggregate output 372 exceeds aggregate threshold value 374, level threshold value comparator circuit 380 asserts a contact output 382.

Contact output 382 and contact output 342 are provided to an OR function 390. Whenever any of the received contact outputs is asserted, OR function 390 asserts a confirmed contact output 392 indicating that a contact was detected. It should be noted that the OR function 390 may be replaced with other combinational logic. For example, where there are three inputs, the combinational logic would be asserted when only one of the three inputs is asserted, or whenever two of the three inputs are asserted. Based upon the disclosure provided herein, one of ordinary skill in the art will appreciate a variety of combinational logic that may be used in place of OR function 390.

Figure 3B:
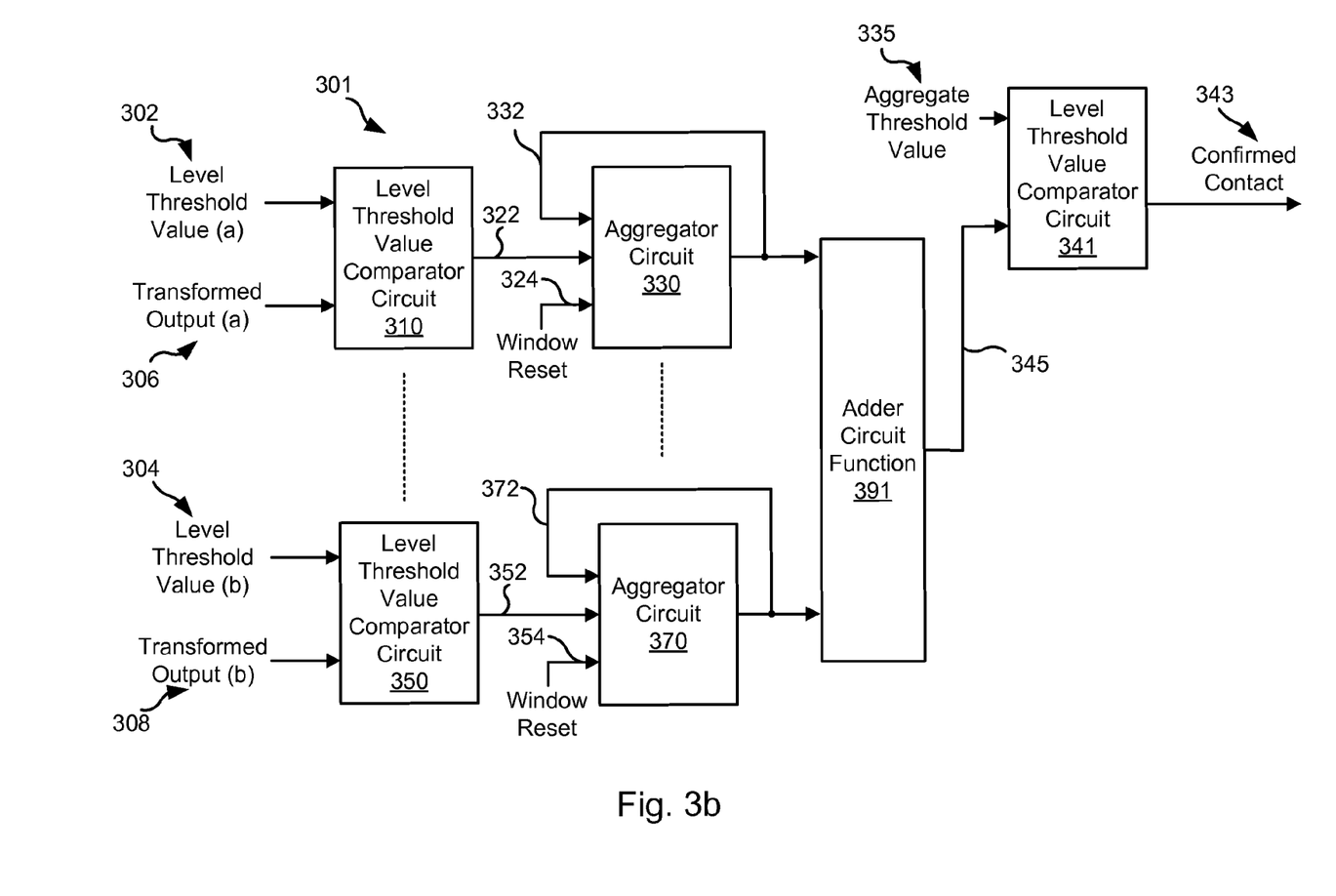
FIG. 3b depicts another two-level thresholding circuit that may be used in relation to the circuit of FIG. 2 in accordance with some embodiments of the present invention.

Turning to FIG. 3b, a two level threshold processing circuit 301 is shown in accordance with various embodiments of the present invention. Two level threshold processing circuit 301 may be used in place of two level threshold processing circuit 290 described above in relation to FIG. 2. Two level threshold processing circuit 301 includes a plurality of level threshold value comparator circuits 310, 350 that compare respective level threshold values with corresponding transformed outputs 306, 308. In particular, level threshold value comparator circuits 310 compares transformed output 306 with level threshold value 302, and level threshold value comparator circuits 350 compares transformed output 308 with level threshold value 304. Where transformed output 306 is greater than level threshold value 302, a preliminary contact indication 322 is asserted, otherwise it is de-asserted. Where transformed output 308 is greater than level threshold value 304, a preliminary contact indication 352 is asserted, otherwise it is de-asserted.

It should be noted that only one or more than two level threshold value comparator circuits may be used in accordance with different embodiments of the present invention. The number of level threshold value comparator circuits corresponds to the number of transformed outputs (i.e., band pass filters in discrete Fourier transform circuit 286) that are provided. The ability to include more or fewer than the two parallel circuits shown is indicated by the dashed lines on FIG. 3b.

An aggregator circuit 330 sums the values provided as preliminary contact indication 322 over a period corresponding to the window width and indicated by a window reset 324. Window reset may be controlled, for example, by a circuit that de-asserts window reset 324 whenever preliminary contact indication 322 is initially asserted, and re-asserts window reset 324 at the end of a period corresponding to a number of bit periods indicated by the window width input 298. A resulting aggregate output 332 is provided to an adder circuit 391.

An aggregator circuit 370 sums the values provided as preliminary contact indication 352 over a period corresponding to the window width and indicated by a window reset 354. Window reset may be controlled, for example, by a circuit that de-asserts window reset 354 whenever preliminary contact indication 352 is initially asserted, and re-asserts window reset 324 at the end of a period corresponding to a number of bit periods indicated by the window width input 298. A resulting aggregate output 372 is provided to adder circuit 391.

Adder circuit 391 sums the received aggregate outputs to yield a sum output 345. Sum output 345 is provided to a level threshold value comparator circuit 341 where it is compared with an aggregate threshold value 335. Where the resulting sum output 345 exceeds aggregate threshold value 335, level threshold value comparator circuit 341 asserts a confirmed contact output 343 indicating that a contact was detected.

Figure 3C:
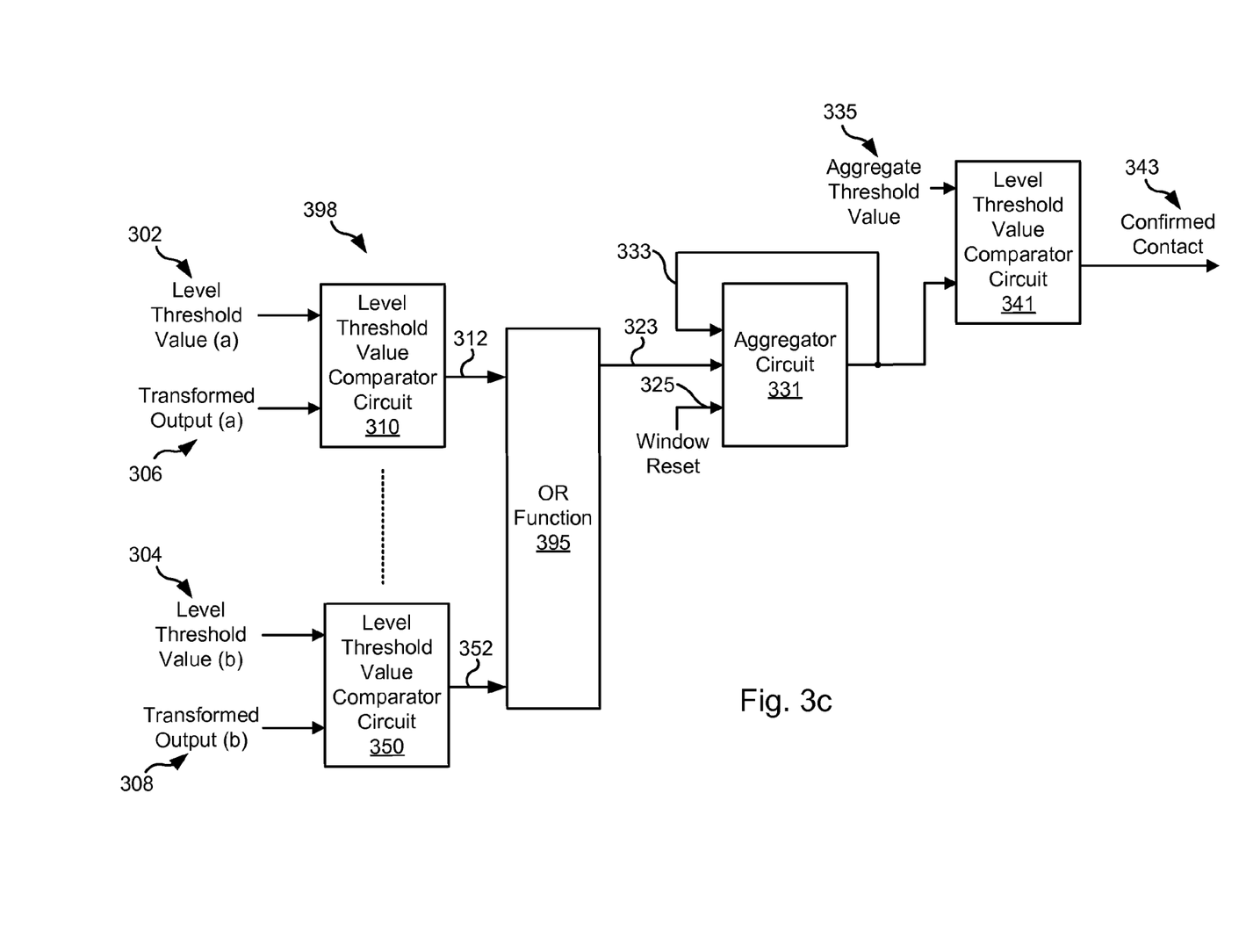
FIG. 3c depicts a two-level thresholding circuit that may be used in relation to the circuit of FIG. 2 in accordance with various embodiments of the present invention.

Turning to FIG. 3c, a two level threshold processing circuit 398 is shown in accordance with some embodiments of the present invention. Two level threshold processing circuit 398 may be used in place of two level threshold processing circuit 290 described above in relation to FIG. 2. Two level threshold processing circuit 398 includes a plurality of level threshold value comparator circuits 310, 350 that compare respective level threshold values with corresponding transformed outputs 306, 308. In particular, level threshold value comparator circuits 310 compares transformed output 306 with level threshold value 302, and level threshold value comparator circuits 350 compares transformed output 308 with level threshold value 304. Where transformed output 306 is greater than level threshold value 302, a preliminary contact indication 312 is asserted, otherwise it is de-asserted. Where transformed output 308 is greater than level threshold value 304, a preliminary contact indication 352 is asserted, otherwise it is de-asserted.

It should be noted that only one or more than two level threshold value comparator circuits may be used in accordance with different embodiments of the present invention. The number of level threshold value comparator circuits corresponds to the number of transformed outputs (i.e., band pass filters in discrete Fourier transform circuit 286) that are provided. The ability to include more or fewer than the two parallel circuits shown is indicated by the dashed lines on FIG. 3c.

Preliminary contact indication 312 and preliminary contact indication 352 are provided to an OR function 395. Where either preliminary contact indication 312 and preliminary contact indication 352 are asserted, a combined preliminary indication 323 is asserted and provided to an aggregator circuit 331. An aggregator circuit 331 sums the values provided as combined preliminary indication 323 over a period corresponding to the window width and indicated by a window reset 325. Window reset 325 may be controlled, for example, by a circuit that de-asserts window reset 325 whenever combined preliminary indication 323 is initially asserted, and re-asserts window reset 325 at the end of a period corresponding to a number of bit periods indicated by the window width input 298. A resulting aggregate output 333 is provided to a level threshold value comparator circuit 341 where it is compared with an aggregate threshold value 335. Where the resulting sum output 345 exceeds aggregate threshold value 335, level threshold value comparator circuit 341 asserts a confirmed contact output 343 indicating that a contact was detected. It should be noted that the OR function 395 may be replaced with other combinational logic. For example, where there are three inputs, the combinational logic would be asserted when only one of the three inputs is asserted, or whenever two of the three inputs are asserted. Based upon the disclosure provided herein, one of ordinary skill in the art will appreciate a variety of combinational logic that may be used in place of OR function 395.

Figure 3D:
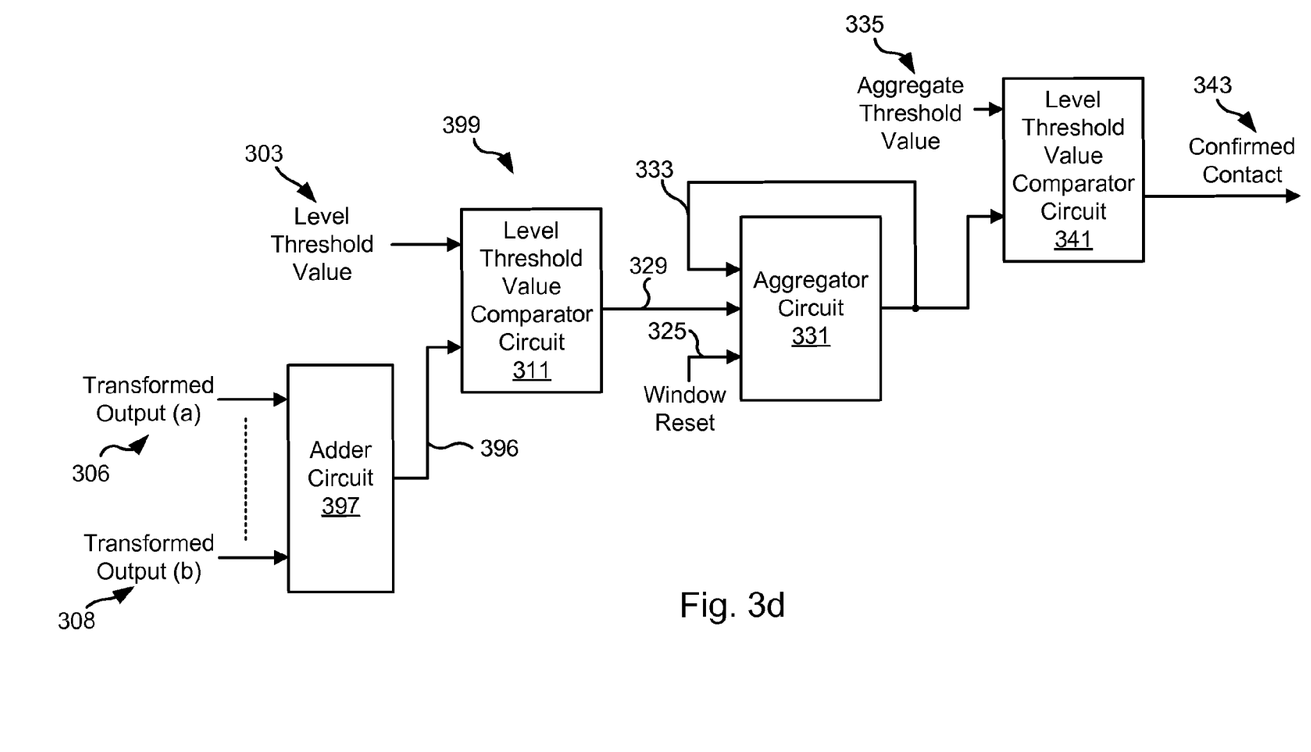
FIG. 3d depicts yet another two-level thresholding circuit that may be used in relation to the circuit of FIG. 2 in accordance with other embodiments of the present invention.

Turning to FIG. 3d, a two level threshold processing circuit 399 is shown in accordance with some embodiments of the present invention. Two level threshold processing circuit 399 may be used in place of two level threshold processing circuit 290 described above in relation to FIG. 2. Two level threshold processing circuit 399 includes an adder circuit 397 that sums the received transformed outputs (i.e., transformed output 306 and transformed output 308) to yield a combined transformed output 396. Combined transformed output is provided to a level threshold value comparator circuit 311 where it is compared with a level threshold value 303 to yield a preliminary contact indication 329. In particular, when combined transformed output 396 is greater than level threshold value 303, preliminary contact indication 329 is asserted at a logic '1', otherwise it is asserted at a logic '0'. It should be noted that only one or more than two transformed outputs may be provided in accordance with different embodiments of the present invention. Of course, where only one transformed output is provided, adder circuit 397 may be eliminated. The ability to include more or fewer than the two parallel inputs shown is indicated by the dashed lines on FIG. 3d.

Preliminary contact indication 329 is provided to an aggregator circuit 331. Aggregator circuit 331 sums the values provided as preliminary contact indication 329 over a period corresponding to the window width and indicated by a window reset 325. Window reset 325 may be controlled, for example, by a circuit that de-asserts window reset 325 whenever combined preliminary indication 323 is initially asserted, and re-asserts window reset 325 at the end of a period corresponding to a number of bit periods indicated by the window width input 298. A resulting aggregate output 333 is provided to a level threshold value comparator circuit 341 where it is compared with an aggregate threshold value 335. Where the resulting sum output 345 exceeds aggregate threshold value 335, level threshold value comparator circuit 341 asserts a confirmed contact output 343 indicating that a contact was detected.

Figure 4:
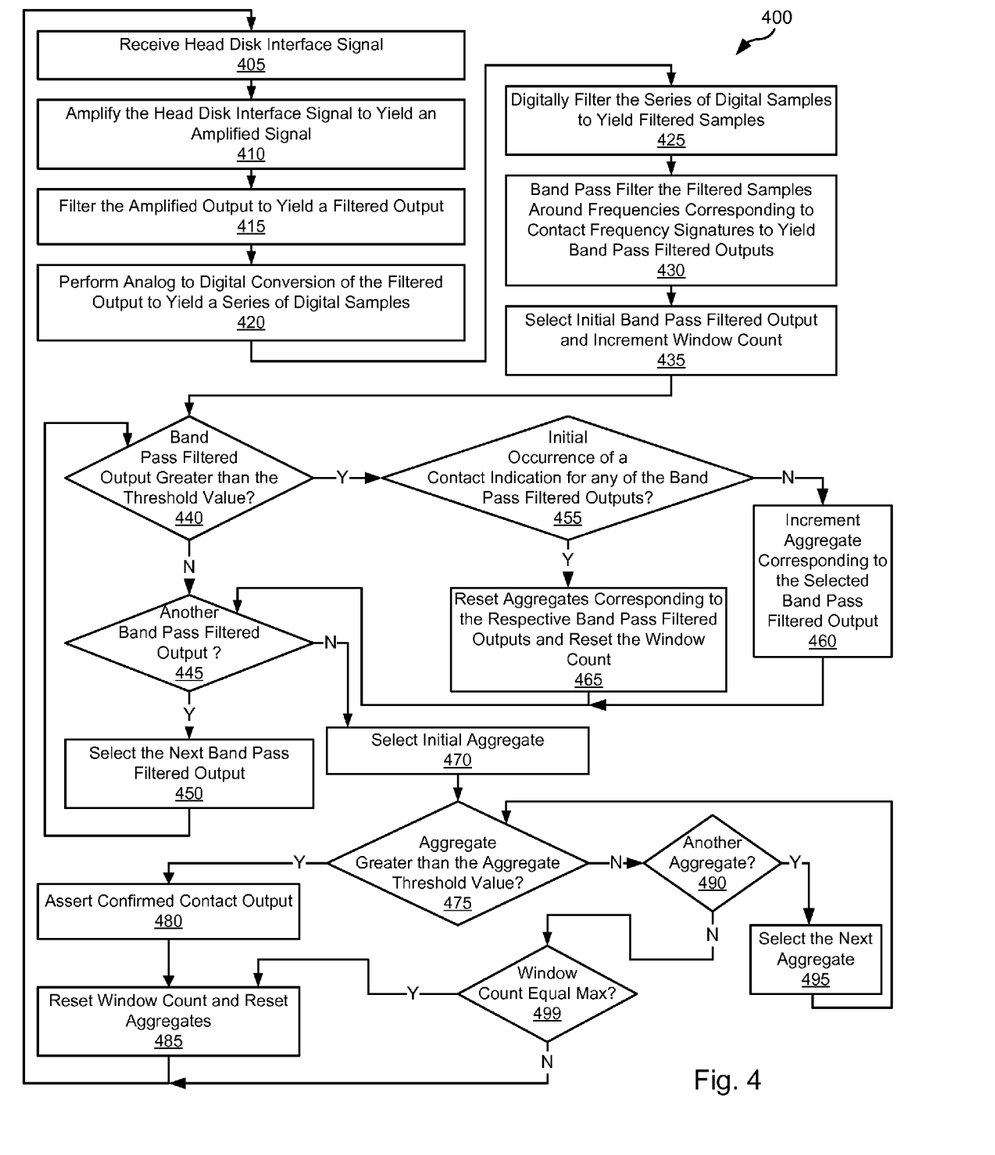
FIG. 4 is a flow diagram showing a method in accordance with embodiments of the present invention for performing head contact detection.

Turning to FIG. 4, a flow diagram 400 shows a method in accordance with embodiments of the present invention for performing head contact detection. Following flow diagram 400, a head disk interface signal is received (block 405). Head disk interface signal provides a signal indicative of contact between a read/write head assembly and a corresponding storage medium. The received head disk interface signal is amplified to yield an amplified signal (block 410), and the amplified signal is filtered using a continuous time filter to yield a filtered output (block 415). An analog to digital conversion is performed on the filtered output to yield a series of digital samples (block 420).

A digital filtering is applied to the series of digital samples to yield filtered samples (block 425). The filtered samples are band pass filtered around one or more frequencies that correspond to contact frequency signatures (i.e., frequencies expected when the read/write head assembly contacts the storage medium) to yield corresponding band pass filtered outputs (block 430). In some embodiments of the present invention, the band pass filters utilize a discrete Fourier transform. In other embodiments of the present invention, the band pass filters are implemented as infinite impulse response filters. Based upon the disclosure provided herein, one of ordinary skill in the art will recognize a variety of band pass filters that may be used in relation to different embodiments of the present invention. The number of band pass filters and corresponding band pass filter outputs corresponds to the number of signature frequencies for the particular implementation.

One of the band pass filtered outputs is selected as an initial band pass filtered output (block 435). In addition, a window count is incremented (block 435). The selected band pass filtered output is compared with a corresponding threshold value (block 440). Where the selected band pass filtered output is greater than the threshold value (block 440), it is determined whether this is the initial occurrence of a contact indication related to any of the band pass filtered outputs (block 455). An initial occurrence is defined as the first assertion of a preliminary contact indication for a given window. Where it is the initial occurrence (block 455), the aggregate values corresponding to each of the respective band pass filtered outputs are reset and the window count is reset (block 465). By resetting the window count, the window period that will be used to test the occurrence of a contact event is restarted. Otherwise, where it is not the initial occurrence (block 455), the aggregate value corresponding to the selected band pass filtered output is incremented (block 460). In either case, it is next determined whether another band pass filtered output remains to be tested during the current bit period (block 445). Where another band pass filter output remains to be tested (block 445), the next band pass filter output is selected (block 450), and the processes of blocks 440, 445, 455, 460, 465 are repeated.

Alternatively, where the selected band pass filter output is not greater than the threshold value (block 440), it is determined whether another band pass filter output remains to be tested (block 445). Where another band pass filter output remains to be tested (block 445), the next band pass filter output is selected (block 450), and the processes of blocks 440, 445, 455, 460, 465 are repeated.

Where no additional band pass filtered outputs remain to be tested during the current bit period (block 445), one of the developed aggregate values calculated in blocks 460, 465 is selected as the initial aggregate value (block 470). It is then determined whether the selected aggregate value is greater than a corresponding aggregate threshold value (block 475). Where the selected aggregate value is not greater than the aggregate threshold value (block 475) it is determined whether another aggregate value remains to be tested (bloc 490). Where another aggregate value remains to be tested (block 490), the next aggregate value is selected (block 495) and the processes of blocks 475, 480, 485, 490 are repeated for the next aggregate value. Otherwise, where no aggregate values remain to be tested (block 490), it is determined whether the window count has reached the maximum (i.e., the value of window width value 298) (block 499). Where the window count has not achieved the maximum value (block 499), the process restarts at the beginning to receive the next input from the head disk interface signal. Alternatively, where the window count has achieved the maximum value (block 499), the window count and the aggregates are reset (block 485) and the process restarts at the beginning to receive the next input from the head disk interface signal. Alternatively, at any time that an aggregate value exceeds the aggregate threshold value (block 475), a confirmed contact output is asserted (block 480). In addition, the window count and the aggregates are reset (block 485) and the process restarts at the beginning to receive the next input from the head disk interface signal.

It should be noted that the various blocks discussed in the above application may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for head contact detection. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for detecting head contact, the method comprising: receiving an interface signal operable to indicate a physical contact between a sensing device and a storage medium;
   band pass filtering a data set derived from the interface signal to yield a first band pass filtered output;
   indicating a number of instances of the bandpass filtered output exceed a first level threshold;
   comparing the number of instances that the first bandpass filtered output exceeds the first level threshold to an aggregate threshold to yield a first contact output;
   band pass filtering the data set derived from the interface signal to yield a second band pass filtered output;
   indicating a number of instances of the second bandpass filtered output that exceed a second level threshold;
   comparing the number of instances that the second bandpass filtered output exceeds the second level threshold to the aggregate threshold to yield a second contact output; and
   asserting a confirmed contact output when either the first contact output or the second contact output is asserted.

2. The method of claim 1, wherein the interface signal provides a contact signature when the sensing device physically contacts the storage device.

3. The method of claim 1, wherein the method further comprises:
   converting a derivative of the interface signal to a series of digital samples, and wherein the data set is derived from the series of digital samples.

4. The method of claim 3, wherein the method further comprises:
   digitally filtering the series of digital samples to yield the data set.

5. The method of claim 1, wherein the first band pass filtered output corresponds to a center frequency that corresponds to a first contact signature, and wherein the second band pass filtered output corresponds to a center frequency that corresponds to a second contact signature.

6. The method of claim 1, wherein the method further comprises:
   providing the sensing device disposed in relation to the storage medium, wherein the sensing device is operable to provide the interface signal.

7. The method of claim 1, wherein indicating the number of instances that the first bandpass filtered output exceeds the first level threshold comprises:
   comparing the first band pass filtered output to the first level threshold to yield a comparator output; and summing the comparator output with an aggregate value to yield an updated aggregate value, wherein the updated aggregate value corresponds to the number of instances that the first bandpass filtered output exceeds the first level threshold.

8. The method of claim 7, wherein the comparator output is asserted to indicate the first band pass filtered output is greater than the first level threshold, and wherein the first contact output is asserted to indicate that the aggregated value is greater than the aggregate threshold.

9. The method of claim 7, wherein a number of instances of the comparator output that are included in the aggregated value corresponds to a programmable window width value.

10. A head contact detection circuit, the circuit comprising:
A first band pass filter circuit operable to band pass filter a derivative of an interface signal to yield a first band pass filtered output, wherein the interface signal is operable to indicate a physical contact between a sensing device and a storage medium, and wherein a center frequency of the first band pass filter circuit is a contact signature;
a first comparator circuit operable to compare the first band pass filtered output with a first level threshold to yield a first comparator output;
a first summation circuit operable to aggregate the comparator output with a first aggregated value to yield the first aggregated value;
a second comparator circuit operable to compare the first aggregated value with an aggregate threshold to yield a first contact output;
a second band pass filter circuit operable to band pass filter the derivative of the interface signal to yield a second band pass filtered output, wherein a center frequency of the second band pass filter circuit is a second contact signature;
a third comparator circuit operable to compare the second band pass filtered output with a second level threshold to yield a second comparator output;
a second summation circuit operable to aggregate the second comparator output with a second aggregated value to yield the second aggregated value;
and a fourth comparator circuit operable to compare the second aggregated value with the aggregate threshold to yield a second contact output; and
asserting a confirmed contact output when either the first contact output or the second contact output is asserted.

11. The circuit of claim 10, wherein a number of instances of the first comparator output that are included in the first aggregated value corresponds to a programmable window width value.

12. The circuit of claim 10, wherein the first band pass filter circuit is implemented as a circuit selected from a group consisting of: discrete Fourier transform circuit and an infinite impulse response filter.

13. The circuit of claim 12, wherein the second band pass filter circuit is implemented as a circuit selected from a group consisting of: discrete Fourier transform circuit and an infinite impulse response filter.

14. The circuit of claim 10, wherein the circuit is implemented in an integrated circuit.

15. The circuit of claim 10, wherein the circuit is implemented as part of a hard disk drive.

16. The circuit of claim 15, wherein the sensing device is integrated in a read/write head assembly.

17. The circuit of claim 15, wherein the hard disk drive includes a read channel, and wherein the band pass filter, the first comparator, the second comparator, and the summation circuit are integrated in the read channel.

18. The circuit of claim 15, wherein the circuit further comprises:
an interface amplifier operable to amplify the interface signal and to provide an amplified output;
an analog to digital converter circuit operable to convert a derivative of the amplified output to a series of digital samples; and
a digital filter circuit operable to filter the series of digital samples to yield the derivative of the interface signal.

19. A hard disk drive system, wherein the system comprises: a storage medium; a read/write head assembly operable to receive a first data set from the storage medium, wherein the read/write head assembly includes a sensing device providing an interface signal operable to indicate a physical contact between the sensing device and the storage medium; a read channel including:
a first band pass filter circuit operable to band pass filter a derivative of the interface signal to yield a first band pass filtered output, wherein a center frequency of the first band pass filter circuit is a first contact signature;
a first comparator circuit operable to compare the first band pass filtered output with a first level threshold to yield a first comparator output;
a first summation circuit operable to aggregate the comparator output with a first aggregated value to yield the first aggregated value;
a second comparator circuit operable to compare the first aggregated value with an aggregate threshold to yield a first contact output;
a second band pass filter circuit operable to band pass filter the derivative of the interface signal to yield a second band pass filtered output, wherein a center frequency of the second band pass filter circuit is a second contact signature;
a third comparator circuit operable to compare the second band pass filtered output with a second level threshold to yield a second comparator output;
a second summation circuit operable to aggregate the second comparator output with a second aggregated value to the second aggregated value;
and a fourth comparator circuit operable to compare the second aggregated value with the aggregate threshold to yield a second contact output; and
asserting a confirmed contact output when either the first contact output or the second contact output is asserted.

20. The hard disk drive system of claim 19, wherein the circuit further comprises:
an interface amplifier operable to amplify the interface signal and to provide an amplified output;
an analog to digital converter circuit operable to convert a derivative of the amplified output to a series of digital samples; and
a digital filter circuit operable to filter the series of digital samples to yield the derivative of the interface signal.

* * * * *